March 7, 1939. M. G. JACOBSON 2,149,441
GAS TESTING METHOD AND APPARATUS
Filed Jan. 11, 1936 2 Sheets-Sheet 1

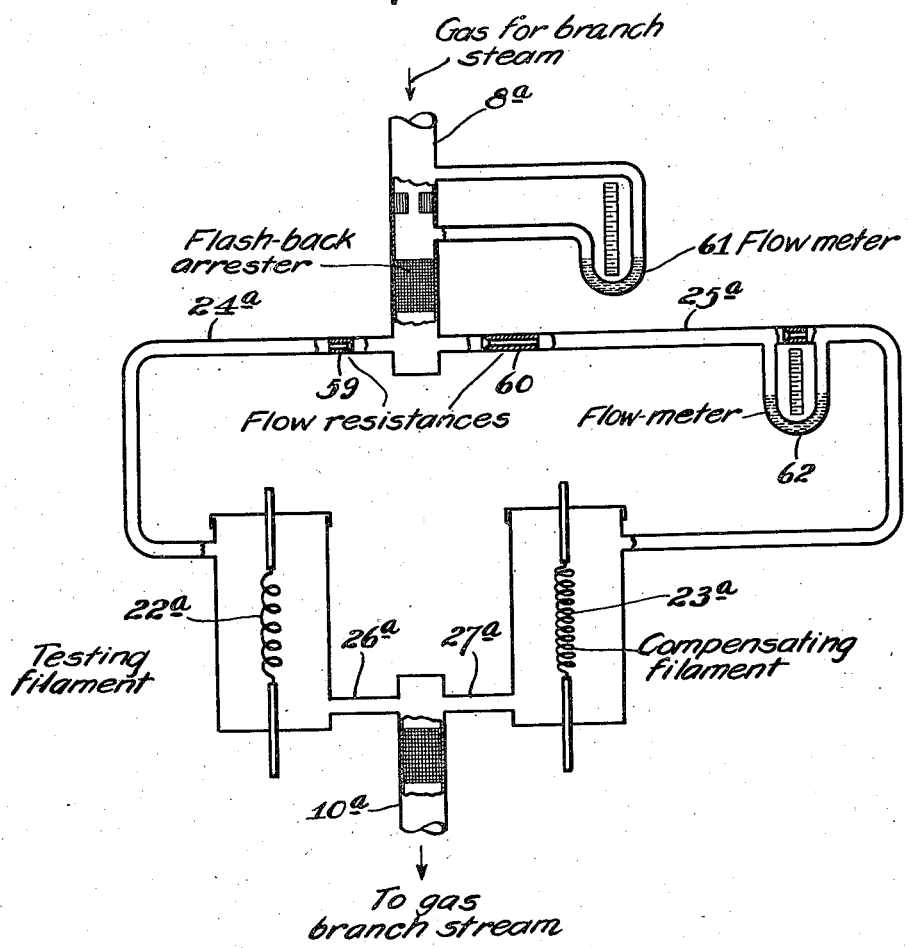

Patented Mar. 7, 1939

2,149,441

UNITED STATES PATENT OFFICE 2,149,441

GAS TESTING METHOD AND APPARATUS

Moses G. Jacobson, Swissvale, Pa., assignor to Mine Safety Appliances Company, Pittsburgh, Pa., a corporation of Pennsylvania Application January 11, 1936, Serial No. 58,683

24 Claims. (Cl. 23—232)

This invention relates to gas testing procedures and means in which the change in resistance of a testing filament upon contact of the gas therewith is applied to indicate the result of the test, and while not restricted thereto, it relates particularly to the determination of the presence and/or amount of a combustible constituent in a gas, such as mixtures of one or more flammable or oxidizable gases or vapors in air.

It is among the objects of the invention to provide a flow system, and a method of regulating flow, for gas testing which minimizes or eliminates disadvantages encountered heretofore in gas testing methods and apparatus, provides desirably small flow but does not require the use of minute flow orifices, and embodies other features that will appear to those skilled in the art from the following description.

Figure 1:
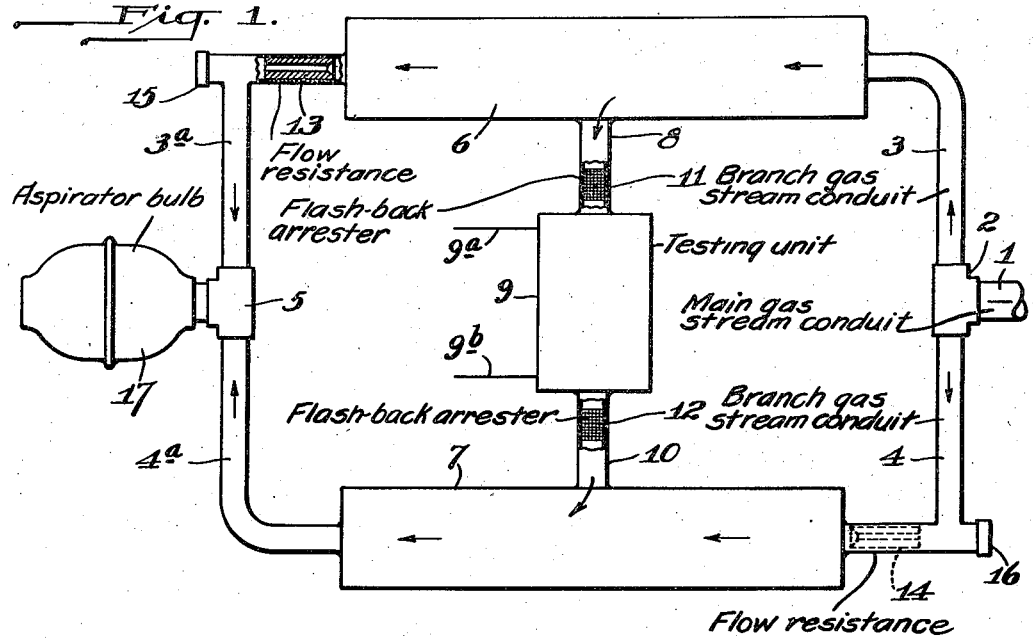
Figure 2:
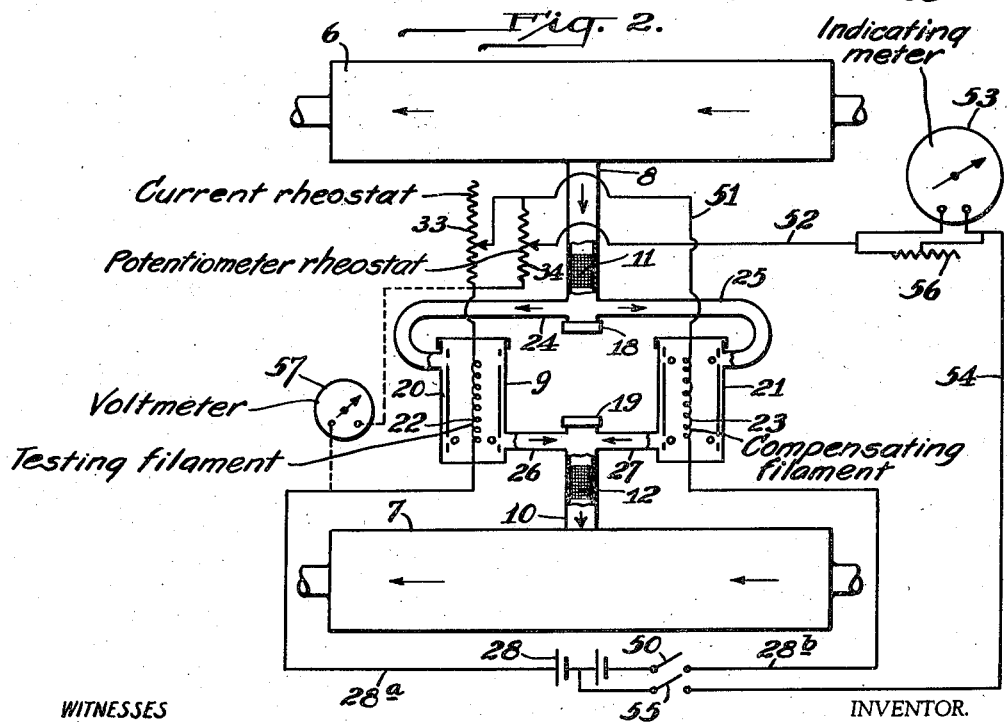

The invention will be described in connection with the accompanying drawings, in which Fig. 1 is a schematic view, partly in section, of the preferred embodiment of the invention together with one type of electrical testing device; Fig. 2 a view showing somewhat schematically one embodiment of testing unit with associated electrical system; Fig. 3 a schematic view somewhat similar to Fig. 2 showing another embodiment.

The invention relates generally to the testing of gases, but for purposes of description and illustration, and because it is especially adapted thereto, the invention will be described with particular reference to the analysis of gases to ascertain the presence and amount of combustible gas or vapor present therein, such as the presence of methane in mine air, by a method in which the gas to be tested is passed into contact with a testing filament, or resistance element, in an electric circuit, the filament being catalytically activated, or heated, or both, whereby any combustible constituent in the sample is oxidized, thus causing the resistance of the testing filament to change, and the change in resistance is applied to indicate the presence and concentration of the combustible constituent.

The invention is predicated upon a flow system in which the gas sample stream is divided into two branch streams flowing in parallel, a portion of the gas from one branch being by-passed to the other branch stream through the testing unit connected as a bridge between the two branch streams. In this manner low and adjustable rates of flow through the testing unit are possible, with concomitant repression or elimination of the disadvantages heretofore presented in connection with this aspect of prior testing methods. The flow through the by-pass, or bridge, stream is caused by creating a difference in head between the two branch streams, preferably by flow resistance inserted in one or both branches, although other means may be applied for that purpose.

Having reference now to the drawings, the sample of gas to be tested is drawn, or forced, into a sampling line 1, Fig. 1, and this main stream of gas is divided into two branch streams as by connecting sampling line 1 to a T 2 whose arms open into branch conduits 3 and 4 having end extensions 3a and 4a which converge at a terminal T connection 5 from which the gas is exhausted, as by passing it to the atmosphere. The gas stream passing through one of the branch conduits is again divided to by-pass a portion of the gas flowing therethrough into a testing unit which exhausts into the other branch conduit and which thus constitutes a bridge between the main branch conduits.

In the embodiment shown chambers 6 and 7 of relatively large volume are inserted in the branch conduits, between 3 and 3a, and 4 and 4a, respectively. These chambers may be formed conveniently by pipes of larger diameter than conduits 3 and 4, as indicated in Fig. 1, such larger chambers, or conduits, being desirable to provide a slow actual gas velocity when the flow is large, thereby minimizing the formation of eddies. A conduit 8 leads from one of the chambers, for example 6, to one or more testing units, one being shown in Fig. 1 and indicated generally by the numeral 9, from which the by-passed test stream flows through a conduit 10 to the other chamber, 7 in this instance. Flash-back arresters 11 and 12 of suitable form are interposed before and after the testing unit in conduits 8 and 10. The testing unit of member 9 is connected by leads 9a and 9b to an electrical testing system, not shown, a variety of such units being known to the art and available for various gas testing purposes, such as determination of combustible constituents, combustion control, and the like.

A flow-restricting member 13, such as a tubular insert having a bore of small diameter compared to that of conduit 3, is inserted in conduit 3a adjacent the outlet from container 6, and a similar member 14 may be inserted in conduit 4 at the inlet to container 7. The bores of these members need not be extremely small, especially where large flow through the testing unit is not needed. By varying the size of the bores of these members, either or both, variable rates of flow may be attained. To this end these portions of the conduits are provided with extensions, as shown, closed by removable caps 15 and 16, and members 13 and 14 are removably mounted in the conduits, as by being screw threaded therein, or by making a sliding fit in the conduits. Or, if desired, flow-regulating adjustable valves, such as needle valves, may be used. In this case one or more flow meters may be used, for instance as shown in Fig. 3 (61 in conduit 8a, 62 in conduit 25a) in order to adjust the sample flow through one or both of the testing units to a certain value and to maintain it constant at that value.

Preferably, conduits 8 and 10 are connected to the centers of containers 6 and 7, respectively, but variations in flow through the bridge branch (between containers 6 and 7) may be had by moving either conduit 8 or 10 to the left or right of center of its container.

In this manner a sample of gas passed into the apparatus through intake line 1 is broken into two streams at the T 2, one stream passing through conduit 3 and another through conduit 4. In container 6 one of the branch streams is again divided, one portion continuing through the container and branch 3a, and the other portion passing through testing unit 9, thence into container 7 where it joins the other branch stream and flows thence through conduit 4a to the outlet 5.

The sample may be drawn through the container in any suitable way, as by means of a suction pump connected to outlet 5, or by means of a pressure pump disposed ahead of T 2. For many purposes, as in portable apparatus, however, it is preferred to use an aspirator bulb 17 connected to the outlet of T 5.

By suitably selecting the flow controlling members 13 and 14 the flow through the testing units 10 can be varied and adjusted to any value from a little less than the maximum flow provided by the pump or aspirating bulb, down to zero. Experience has shown that gas testers of the resistance type, especially of the preferred form described hereinafter, operate most efficiently with a flow of less than about 1 liter per minute past the testing unit. On the other hand, in order to convey the sample over a considerable distance to the testing unit with as small a time lag as possible it is desirable to use as high a rate of sample flow as possible. The only known way of combining these two contradictory requirements practiced up to this time has been to insert the testing unit into a by-pass to a portion of the main sampling line; the flow in the by-pass line containing the test unit and the flow in the portion of the main line across which the by-pass is connected, are then in inverse proportion to their respective flow resistances.

The flow system of the present invention has first of all the advantage of being substantially more immune against eddies and sudden changes and surges in the main line flow due to irregularities in pump action, vibrations and the like, than the above-mentioned system or other systems known to me. Any pressure variation in the main line in the practice of the present invention reaches the intake and outlet of the bridge line, containing the test unit or units, with the same strength and at substantially the same moment so that they counteract each other and exert little effect in the testing unit, while in all other flow systems known to me any disturbance in the main line flow is transferred to the testing unit substantially to its full extent.

In apparatus of this character evaporation of the platinum filament, or exhaustion of one or more chemical constituents, occurs, necessitating replacement of such element from time to time. Also, other parts such as flash-back arresters have to be renewed occasionally. In making such changes it is unavoidable that the flow resistance of the line containing the unit is somewhat changed. The flow through the units in prior flow systems depends directly on the ratio of the flow resistance of the branch containing the units to the resistance of the branch which is in parallel or series with it, and in addition, any change in the flow resistance of the unit branch will change also the pressure head applied to it.

In the present invention a change in the unit branch does not substantially affect the pressure head applied to it, and the reaction of a flow resistance change in the bridge line, which contains the units, on the rest of the system is much smaller than in prior apparatus. Consequently, with the apparatus provided by this invention manufacturing variations of test units, flash-back arresters, and the like, do not require a readjustment of the flow system such as is required in other apparatus.

Furthermore, the present invention makes it possible to accomplish one feature which is not attainable with other apparatus known to me, to wit, to obtain a zero pressure difference at the ends of the branch line in which the units are located, and have the sample go into the testing unit chambers by thermal-convection only. Thus, in accordance with the present invention by adjusting the four bridge branches to equal flow resistance (or more generally, so that the ratio of two adjoining flow resistances is equal to the ratio of the other two), the flow through the units caused by the pump action becomes zero and thereby independent of any changes in the pump action or in the main line flow in general. Finally, it is possible with the apparatus of my invention to reverse the direction of flow through the test units, which is not possible with other apparatus of this character known to me. This feature might be applied, for instance, to counteract the thermal-convection and to stop the sample from reaching the units altogether, and in this way to check electrical or thermal characteristics of the units without stopping the flow of sample in the main line.

To provide for changing the flash-back arresters, conduits 8 and 10 are provided with removable closure caps 18 and 19, respectively, which should, of course, make a gas-tight connection with the ends of the conduits.

The testing unit 9 may be of any suitable type. A particularly desirable form adapted especially for use in determining combustible constituents is shown in Fig. 2. It comprises a pair of elements in the form of containers 20 and 21 having filaments 22 and 23, respectively, extending therethrough. Conduits 24 and 25 connect containers 20 and 21, respectively, to bridge conduit 8, and the gas passed through the bridge branch passes to bridge conduit 10 and container 7 through conduits 26 and 27.

Heretofore in two-wire types of apparatus it has been customary to conduct the sample to be tested over one of a pair of electrically heated filaments adapted to cause combustion of a combustible constituent in the gas. The other heated filament, used for compensation purposes, has been customarily sealed in air or other constant atmosphere, it being not possible heretofore to expose the sample to both filaments because combustion would have been caused in each, which would have precluded any determination.

Experience has shown also that detectors of this type are influenced by the humidity of the gas being tested, which is especially serious in detecting methane in small concentrations in mine atmospheres, where the relative humidity may vary from about 30 to 100 per cent. Such amounts of water vapor cause changes in thermal conductivity which detrimentally affect the reliability of the apparatus. To take care of this factor it has been necessary to pass the gas to be tested through a drying tube filled with calcium chloride or other drying agent, which has rendered the apparatus susceptible to false indications if the drying material becomes exhausted or fails to operate satisfactorily, which has rendered the apparatus more complicated and cumbersome, and has endangered its reliability.

The foregoing and other disadvantages may be overcome by passing the gas sample over both of the heated filaments, one of the filaments, i. e., the testing filament, being catalytically active, as, for example, by being composed of platinum treated to confer catalytic oxidizing properties, while the other, or compensating, filament is catalytically inactive, or is rendered so. Most suitably the compensating filament is formed of platinum and prior to use is subjected to one of the known catalyst poisons, such as phosphine or arsine, so that no combustion of combustible constituents in the gas occurs when the sample is passed through the compensating element. Moreover, this prevents the compensating filament from becoming activated from accidental heating in gas atmospheres, and it insures retention of the inactive state. And as indicated hereinabove, it is preferred to mount the filaments as separate elements, using separate gas streams, although it is possible to pass a single gas stream over both filaments mounted in a single container.

In this manner the sample may be passed concurrently in equal sub-branch streams over the testing and compensating filaments to obtain the indication due to change in resistance of the testing filament through the heat liberated in combustion of a combustible constituent, or constituents, present in the gas, while the aforementioned influences are eliminated. This also eliminates the influence of humidity, since both of the filaments are subjected to the gas under test and the influence of humidity is substantially equal on both filaments since the flow over the two filaments is substantially equal.

The same result may be had in another way, without using equal flow over the two filaments. It has been shown heretofore that an electrothermal balance can be obtained with a limited range of voltage variations by making the catalytically inactive compensating and catalytically active detector filaments of the same kind of wire but using for the compensating filament wire of larger diameter and correspondingly greater length than used in the testing filament. However, with such relation between the filaments the influence of humidity and of flow variations is not the same for both filaments. I have discovered that by conveying the gas sample over two filaments related as just described, not at equal rates of flow, as in the preceding embodiment, but at different rates of flow there results not only an electrothermal balance for a greater range of voltage variation, and a better balance against flow variation, but also an almost complete balancing out of humidity variations. Also, through the use of a compensator filament of larger diameter than the testing filament the former operates at a temperature below the activation point, so that the use of such a compensator filament is as efficient and satisfactory as the above-described method in which the compensator filament is poisoned.

Such unequal flow of gas sample through the two branches of the bridge stream may be, and preferably is, obtained by the use of flow resistance, to provide the necessary unequal rates of flow so that the influences of humidity and flow variations upon the two filaments will be alike. For example, one or both of the branches of the bridge stream may be provided with flow resistances of the type referred to hereinabove. This is illustrated in Fig. 3 in which the bridge stream flows through conduits 8a and 10a as in Figs. 1 and 2. Assuming the flow to be from conduit 8a to conduit 10a, the bridge stream from 8a is divided to form branches 24a and 25a leading, respectively, to a testing filament 22a and a compensating filament 23a of the same kind of wire but of larger diameter and proportionately greater length than testing filament 22a. Conduits 26a and 27a lead the gas from the casings enclosing the testing and compensating filaments, respectively, to conduit 10a. The flow of gas through the branch conduits is rendered unequal by creating unequal flow resistance in the branches. One embodiment is shown in Fig. 3 in which flow resistance members 59 and 60, like those described in connection with Fig. 1, are disposed in conduits 24a and 25a, respectively. These resistances are designed to provide sufficiently smaller flow through conduit 25a and over filament 23a to compensate for variations in flow and for humidity influences created by the difference in sizes of the two filaments. In the embodiment shown resistance 60 is sufficiently longer than resistance 59 to accomplish that result. This unequal flow in the branch conduits can be attained in other ways, as by using a single flow resistance member, or by the use of branch conduits of different diameter, or by using flow resistance members having bores of different size. One or more flow meters, such as 61 and 62, may be installed for use in regulating and controlling constancy of the flow; these flow meters may, of course, be positioned otherwise than shown if desired.

This type of two-element unit in which gas is passed over both elements has the further advantage that changes in barometric pressure have no effect on the reliability of the unit. In prior practice the compensating filament has been sealed in a container filled with air, and it has been necessary usually to make zero settings at an atmospheric pressure the same as that of the test sample because a change in barometric pressure would throw the apparatus out of balance. Thus, an increase in pressure and density increases the rate of heat transfer from the testing filament, thereby lowering its temperature, while no such result occurs with the sealed compensating filament. This may occur with an apparatus calibrated at the surface of the earth and used in a deep mine, or in a submarine or aircraft. Such a result will throw the instrument out of balance and will result in a fictitious indication.

In the present invention any changes due to variations in barometric pressure are substantially equal for both filaments, so that once a balance is obtained and indicated by a zero adjustment, the adjustment will be maintained against any reasonable changes of barometric pressure.

In prior practice the heated filaments have commonly been embodied in Wheatstone bridge circuits for the purpose of measuring changes in resistance of the testing filament caused by a combustible gas in the sample undergoing test. The Wheatstone bridge circuit may be used if desired with testing units of various types applicable in the practice of the invention. But as ordinarily constructed this circuit entails relatively large current consumption because in addition to the relatively heavy current required in the testing branch, there is required a nearly equal current in the other branch unless the resistance of the latter is made higher than usual, in which case sensitivity is sacrificed.

In accordance with the preferred practice of the present invention a novel testing circuit is used which embodies advantages over both Wheatstone bridge and ordinary potentiometric methods. To this end the testing and compensating filaments are connected in series with a battery, changes in resistance of the testing filaments being measured by sensitive measuring or indicating means connected between the junction of the two filaments and the battery in such manner that the battery is subdivided into two groups of cells whose electromotive forces are proportional to the resistances of the filaments.

In the preferred embodiment of the invention the resistances of the testing and compensating filaments are equal and the battery comprises an equal number of cells, while the measuring circuit is connected between the junction of the filaments and the mid-point of the battery. The filaments having equal resistances, and there being the same number of batteries on each side of the connection, the electromotive forces are thus proportional to the resistances of the filaments.

Wiring for such a circuit is shown in Fig. 2. The testing filament, for example 22, and the compensating filament 23, are connected in series with each other by conductors 28a and 28b with a battery 28 composed of an equal number of cells, two being shown by way of example. A switch 50 is inserted in this circuit. The two filaments are connected in series through a potentiometer rheostat 34 and conductor 51, and a current adjusting rheostat 33. A conductor 52 connected to the slider of rheostat 34 connects it to one terminal of the indicating meter 53, the other terminal being connected by a lead 54 and switch 55 to the mid-point of battery 28. A rheostat 56 may be connected to meter 53, as shown, to regulate its sensitivity, and a voltmeter 57 is connected across the ends of filament 22.

In the use of this apparatus switches 50 and 55 are closed, whereby heating current flows through the testing unit. The initial temperature of the testing filament is checked by voltmeter 57, and if the proper predetermined voltage is not applied to the filament, rheostat 33 is adjusted to set the voltage at the predetermined value most suitable for the characteristics of the filament, thus setting its initial temperature. If the indicator 53 does not read zero, rheostat 34 is adjusted to bring the instrument to its zero setting.

The apparatus is now ready for use, and gas is drawn through it in the manner described hereinabove. Combustible constituent present in the gas is oxidized by filament 22, causing the latter to become hotter and to change in resistance. This causes a direct reading on meter 53. This meter may be calibrated according to need, using known gas mixtures, e. g., to give direct readings of degree of combustibility, or concentration of methane, or the like.

As often as need be the voltage applied to the testing filament is checked in the manner described, and adjusted, where necessary, by rheostat 33. Likewise, zero setting may be adjusted when necessary by potentiometer rheostat 34. In the latter instance air free of combustibles is aspirated or, in the absence of the latter, aspiration of gas is stopped for a short interval, say 3 to 5 minutes, during which combustibles in the residual gas will have been oxidized. Up-flow of hot products of combustion will prevent entry of fresh gas, and the indicator should read zero. If it does not the proper adjustment is made. Of course, meter 53 may be either a meter or a recording device, or other similar element.

Subject matter disclosed but not claimed herein is claimed in a copending application, Serial No. 711,398, filed by me on February 15, 1934, of which this application is a continuation-in-part.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. In a process of testing a gas, the steps comprising dividing a main gas sample stream into two branch streams, and passing a portion of the gas as a bridge stream from one of said branch streams through a testing unit to the other branch stream.

2. In a process of testing a gas, the steps comprising dividing a main gas sample stream into two branch streams, creating a pressure head between a point in one of said branch streams and a point in the other of said branch streams, and applying said head to by-pass a portion of the gas as a bridge stream from one branch stream through a testing unit to the other branch stream.

3. In a process of testing a gas, the steps comprising dividing a main gas sample stream into two branch streams, interposing flow resistance in at least one of said branch streams to create a pressure head between the branch streams, and applying said head to pass as a bridge stream a regulated portion of gas from one branch through a testing unit to the other branch stream.

4. In a process of testing a gas, the steps comprising dividing a main gas sample stream into two branch streams, and connecting a bridge stream including a testing unit between said branch streams at points providing a desired pressure head therebetween to cause a portion of gas to flow through said bridge stream between said branch streams.

5. In a process of testing a gas, the steps comprising dividing a main gas sample stream into two branch streams, creating a pressure head between said branch streams, applying said head to by-pass a regulated portion of gas as a bridge stream between said branch streams, subdividing said bridge stream into two portions, passing one of said bridge stream portions over a testing filament, and passing the other of said bridge stream portions over a compensating filament.

6. In a process of testing gas, the step comprising dividing a main gas sample stream into two unequal stream portions, conducting one of said unequal stream portions over a testing filament, conducting the other of said unequal stream portions over a compensating filament of different cooling characteristics than said testing filament, and adjusting the flow ratios of said branch stream portions to provide equal cooling rates of said filaments by the gas sample.

7. In a process of testing gas, the steps comprising dividing a main gas sample stream into two branch streams, creating a pressure head between said branch streams, applying said head to by-pass a regulated portion of gas as a bridge stream between said branch streams, subdividing said bridge stream into two portions of unequal flow, passing one of said stream portions over a testing filament and the other of said stream portions over a compensating filament whose cooling characteristic is different than that of said testing filament with equal rates of gas flow, and adjusting the flow ratios of said stream portions substantially in inverse proportion to the cooling rates of said filaments and thereby providing equal cooling of said filaments by various constituents of the gas sample.

8. In a process of testing a gas for combustible constituents, the steps comprising dividing a main gas sample stream into two branch streams, passing a portion of the gas as a bridge stream from one of said branch streams through a testing unit to the other of said branch streams, and regulating the flow in said bridge stream by at least one flow resistance disposed in one of said branches to create unequal resistance to flow in the branch streams.

9. In a process of testing a gas, the steps comprising dividing a main stream of gas sample into two branch streams, passing a portion of the gas as a bridge stream from one of said streams through a testing unit to the other of said branch streams, and regulating the flow in said bridge stream by flow resistances disposed in each of said branches on opposite sides of said bridge stream to create unequal resistance to flow.

10. Gas testing apparatus comprising a main conduit for gas to be tested, branch conduits connected to said main conduit, a bridge conduit connecting said branch conduits at points having a desired pressure differential for passing a portion of gas from one of said conduits to the other, and a testing unit interposed in said bridge conduit.

11. Gas testing apparatus comprising a main conduit for gas to be tested, branch conduits connected to said main conduit, a bridge conduit connecting said branch conduits, a flow resistance associated with one of said branch conduits to create a pressure head therebetween, and a testing unit interposed in said bridge conduit.

12. Gas testing apparatus comprising a main conduit for gas to be tested, a pair of branch conduits connected to said main conduit, a bridge conduit connecting said branch conduits, a flow resistance disposed in one of said branch conduits ahead of said bridge conduit, a flow resistance disposed in the other of said branch conduits beyond said bridge conduit, and a testing unit disposed in said bridge conduit.

13. Apparatus according to claim 12, one of said resistances being variable to regulate the pressure head created thereby between the branch conduits.

14. Apparatus according to claim 10, said testing unit comprising a testing filament, a compensating filament, an electrical testing circuit associated with said filaments.

15. Gas testing apparatus comprising a testing unit including a testing filament, a compensating filament having, as compared with said testing filament, an equal thermal resistance coefficient but an unequal cooling surface, and a balanced electrical circuit associated with said filaments; a main conduit for gas to be tested, secondary conduits for dividing said main conduit into two parallel flow branches, one of said branches containing said testing filament, the other of said branches containing the compensating filament, and at least one of said branches being provided with means for adjusting the gas flow therethrough to compensate for said unequal cooling surface.

16. Gas testing apparatus comprising a conduit for gas to be tested, branch conduits connected to said main conduit, a bridge conduit connecting said branch conduits and having disposed therein a testing filament and a compensating filament having a surface unequal to that of said testing filament, means for adjusting the flow of gas over one of said filaments to compensate for the inequality in cooling due to the difference in their surface, and an electrical measuring circuit associated with said filaments.

17. In a gas testing process the steps comprising dividing a main gas sample stream into two branch streams, and passing a portion of the gas as a bridge stream from one of said branch streams through a gas testing unit to the other of said branch streams, said bridge stream subdividing each of said branch streams into two parts at least one of which differs from the rest in resistance to gas flow.

18. In a gas testing apparatus, a gas sample stream conduit, a pair of branch conduits associated therewith, a testing filament disposed in one of said branch conduits, a compensating filament disposed in the other of said branch conduits, said compensating filament being formed from the same wire as said testing filament but being of sufficiently greater diameter to prevent its heating to a temperature at which combustion of gas sample may occur, means for adjusting the flow ratios of the gas flowing through said branch conduits for providing equal cooling rates of said filaments, and an electrical circuit connected to said filaments.

19. Gas testing apparatus comprising a testing unit including a testing filament, a compensating filament, and a balanced electrical circuit associated with said filaments, said filaments in the balanced condition of said circuit being heated to unequal temperatures; a main conduit for gas to be tested, secondary conduits connected to said main conduit for passing said gas over both of said filaments, and means associated with at least one of said secondary conduits for adjusting the gas flow rate over said filaments to equalize the effect of the cooling of said unequally heated filaments by the gas flow upon the balance of said electrical circuit.

20. In a gas testing process the steps comprising dividing a main gas sample stream into two parallel-flow branch streams, creating a bridge stream, including a testing unit, connecting said branch streams, reuniting said branch streams beyond said bridge stream, and causing gas sample to flow through said branch and bridge streams.

21. In a method according to claim 20, the step comprising interposing flow resistance in at least one of the branch streams to create a pressure head therebetween and cause desired gas flow through the bridge stream.

22. Gas testing apparatus comprising a main conduit for gas to be tested, a pair of branch conduits connected to said main conduit, a bridge conduit connecting said branch conduits, a flow resistance associated with one of said branch conduits to create a pressure head therebetween, a testing unit interposed in said bridge conduit, means connecting said branch conduits to a common conduit beyond said bridge conduit, and means for causing flow through said branch conduits.

23. Gas testing apparatus comprising a main conduit for gas to be tested, a pair of branch conduits connected to said main conduit, a bridge conduit connecting said branch conduits, a flow resistance disposed in one of said branch conduits ahead of said bridge conduit, a flow resistance disposed in the other of said branch conduits beyond said bridge conduit, a testing unit disposed in said bridge conduit, means connecting said branch conduits to a second main conduit beyond said bridge conduit, and means associated with one of said main conduits for causing gas flow.

24. In a gas testing process the steps comprising dividing a main gas sample stream into two parallel-flow branch streams, diverting a portion of the gas sample from one of said parallel-flow branch streams to the other of said parallel-flow branch streams through a bridge stream, sub-dividing said bridge stream into two parallel-flow bridge stream portions, passing one of said bridge stream portions over a testing filament, passing the other of said bridge stream portions over a compensating filament, and re-uniting said parallel-flow branch streams beyond the junctions between said bridge stream and said parallel-flow branch streams.

MOSES G. JACOBSON.